US 6,608,169 B2

(12) United States Patent
Abe

(10) Patent No.: US 6,608,169 B2
(45) Date of Patent: Aug. 19, 2003

(54) ANTISTATIC MOLDED ARTICLE COMPRISING A POLYESTERAMIDE RESIN

(75) Inventor: Motoji Abe, Kanagawa (JP)

(73) Assignee: DSM N.V., Heerlen (NL)

( * ) Notice: Subject to any disclaimer, the term of this patent is extended or adjusted under 35 U.S.C. 154(b) by 0 days.

(21) Appl. No.: 09/902,468

(22) Filed: Jul. 11, 2001

(65) Prior Publication Data

US 2002/0049285 A1 Apr. 25, 2002

Related U.S. Application Data

(63) Continuation of application No. PCT/NL00/00035, filed on Jan. 18, 2000.

(30) Foreign Application Priority Data

Jan. 18, 1999 (JP) .............................. 11-009219
Aug. 10, 1999 (JP) .............................. 11-226868
Dec. 9, 1999 (JP) .............................. 11-350458

(51) Int. Cl.$^7$ ........................ C08G 69/44; C08G 63/44; C08F 283/04
(52) U.S. Cl. ........................ 528/310; 528/170; 528/271; 528/272; 528/288; 528/292; 528/322; 528/354; 528/361; 525/420; 525/437; 525/450
(58) Field of Search ................................. 528/288, 271, 528/272, 292, 354, 356, 170, 310, 322; 525/437, 450, 420

(56) References Cited

U.S. PATENT DOCUMENTS

| 4,031,164 A | 6/1977 | Hedrick et al. ............. 528/275 |
| 4,223,112 A | 9/1980 | Hedrick et al. ............. 525/432 |
| 4,346,200 A | 8/1982 | Woodbrey ................... 525/421 |
| 5,096,995 A | * 3/1992 | Fukumoto et al. .......... 528/125 |
| 5,644,020 A | * 7/1997 | Timmermann et al. ..... 528/288 |
| 5,886,098 A | * 3/1999 | Ueda et al. ................... 525/66 |
| 5,902,874 A | * 5/1999 | Roby et al. .................. 528/310 |
| 6,268,030 B1 | * 7/2001 | Zhang et al. ................ 528/308 |
| 6,355,716 B1 | * 3/2002 | Zhang et al. ................ 524/436 |

FOREIGN PATENT DOCUMENTS

| EP | 0 303489 A | 2/1989 |
| EP | 0 613 919 A | 9/1994 |
| EP | 0 712 879 A | 5/1996 |
| GB | 1 099 456 A | 1/1968 |
| GB | 1 297 546 A | 11/1972 |
| GB | 1 419 979 A | 12/1975 |
| GB | 1 518 060 A | 7/1978 |
| JP | 03-215550 | * 9/1991 |
| JP | 06-093252 | * 4/1994 |

* cited by examiner

*Primary Examiner*—P. Hampton-Hightower
(74) *Attorney, Agent, or Firm*—Pillsbury Winthrop LLP

(57) ABSTRACT

An antistatic molded resin article based on polyesteramide has a low resistivity even when a substantive amount of electrically conductive additive is not used. The molded article is prepared by copolymerizing (a) a cyclic amide and ($b_1$) cyclic ester or a mixture of cyclic ester ($b_1$) and at least one linear ester ($b_2$) selected from polyesterpolyol, polyesterhetherpolyol or polycabonatepolyol. The surface resistivity is less than $10^{13}\Omega$.

54 Claims, No Drawings

ANTISTATIC MOLDED ARTICLE COMPRISING A POLYESTERAMIDE RESIN

CROSS-REFERENCE TO RELATED APPLICATIONS

This Application is a continuation of International Application PCT/NL00/00035, filed Jan. 18, 2000, which designated the U.S. and was published in the English language.

FIELD OF THE INVENTION

The invention relates to an antistatic molded article comprising a polyesteramide resin, particularly a molded article comprising a resin prepared by copolymerizing a cyclic amide and/or a cyclic ester and/or a linear ester, and further a molded article comprising a polyesteramide resin prepared by reacting a chemical compound having at least two hydroxyl groups, together with the above monomers.

PRIOR ART

A molded resin article provided with an antistatic property is widely used in electric appliances and electronic instruments. Especially, this is used in various kinds of parts used in production lines of semiconductor-related products, such as carrier pallets, housings, bearings, guides, and rollers.

To provide an antistatic property to a polymer matrix, for example, thermoplastic resins, the following methods have been employed: to add an electrically conductive filler such as graphite, carbon black, carbon fibers, metal oxides, metal powder, and metal fibers; to add or apply an antistatic agent to the surface, such as a surface-active agent; or to add an electrically conductive polymer.

It is rather easy to decrease a surface conductivity by blending in an electrically conductive filler. However, the filler must be added usually in an amount of as much as about 20 wt % of the molded article, so that homogeneous dispersion is difficult. Further, there is a problem of high costs. When an electrically conductive carbon filler is used, a molded article gets black and therefore coloration is limited, and sometimes its application field may be limited because of contamination with carbon powder. Further, it is difficult to steadily attain a required resistivity range of an order of from $10^9$ to $10^{12}\Omega$. If the resistivity is lower than this, in IC related parts, circuits in the IC may be damaged.

In the case where a surface-active agent is added to the polymerization system, the surface-active agent may inhibit the reaction or decompose at a high mold temperature; and even when the required resistivity is attained, the resistivity may change with time or a problem of ion extraction may arise, which problem is fatal in semiconductor production lines. In the case where a surface-active agent is applied on a surface of a molded article, there are problems that heat resistance is poor; the antistatic property degrades with time; and the surface-active agent adversely affects circuits in IC related parts.

The use of an electrically conductive polymer is better in that there is not the problem of ion extraction. However, the polymer is very expensive, and the molding temperature may be a limiting factor, like in the case of the use of a surface-active agent.

PROBLEM TO BE SOLVED BY THE INVENTION

The object of the present invention is to provide an antistatic molded article having a desired surface resistivity without using a substantive amount of an electrically conductive additive, which article can be obtained easily and economically.

MEANS TO SOLVE THE PROBLEMS

To solve the above problems, the present inventor has had an idea of attaining using a substantive amount of an electrically conductive antistatic property only by molecular skeleton structure without using a substantive amount of an electrically conductive additive, and has completed the present invention.

Thus the present invention is an antistatic molded article comprising a polyesteramide resin, characterized in that said molded article is prepared by copolymerizing (a) a cyclic amide and at least one ester selected from the group consisting of ($b_1$) a cyclic ester and ($b_2$) at least one linear ester selected from the group consisting of polyesterpolyol, polyesteretherpolyol, and polycarbonatepolyol, said molded article having a surface resistivity of less than $10^{13}\Omega$.

Preferred embodiments of the above antistatic molded article comprising a polyesteramide resin are as follows:

the antistatic molded article comprising a polyesteramide resin, wherein the surface resistivity is in a range of from $10^9$ to $10^{12}\Omega$;

the antistatic molded article comprising a polyesteramide resin, wherein said molded article is prepared by ring-opening copolymerizing the cyclic amide (a) and the cyclic ester ($b_1$) in a weight ratio of (a) to ($b_1$) of from 100:3 to 100:44;

the antistatic molded article comprising a polyesteramide resin, wherein said molded article is prepared by copolymerizing the cyclic amide (a) and the cyclic ester ($b_1$) in a weight ratio of (a) to ($b_1$) of from 100:3 to 100: less than 10, wherein an electrically conductive material is further provided;

the antistatic molded article comprising a polyesteramide resin, wherein said molded article is prepared by ring-opening copolymerizing the cyclic amide (a) and the cyclic ester ($b_1$) in a weight ratio of (a) to ($b_1$) of from 100:10 to 100:34;

the antistatic molded article comprising a polyesteramide resin, wherein said molded article is prepared by copolymerizing the cyclic amide (a) and the linear ester ($b_2$), or a mixture of the linear ester ($b_2$) and the cyclic ester ($b_1$) in a weight ratio of (a) to ($b_2$) or (a) to the mixture of ($b_2$) and ($b_1$) of from 100:2 to 100:50;

the antistatic molded article comprising a polyesteramide resin, wherein said molded article is prepared by copolymerizing the cyclic amide (a) and the linear ester ($b_2$) or a mixture of the linear ester ($b_2$) and the cyclic ester ($b_1$), in a weight ratio of (a) to ($b_2$) or (a) to the mixture of ($b_2$) and ($b_1$) of from 100:2 to 100: less than 5, wherein an electrically conductive material is further provided;

the antistatic molded article comprising a polyesteramide resin, wherein said molded article is prepared by copolymerizing the cyclic amide (a) and the linear ester ($b_2$) or the mixture of the cyclic ester ($b_1$) and the linear ester ($b_2$), in a weight ratio of (a) to ($b_2$) or (a) to the mixture of ($b_2$) and ($b_1$) of from 100:5 to 100:45;

the antistatic molded article comprising a polyesteramide resin, having a tensile strength, measured according to ASTM D-638, of at least 40 MPa;

the antistatic molded article comprising a polyesteramide resin, wherein the linear ester ($b_2$) is polycaprolactonediol;

the antistatic molded article comprising a polyesteramide resin, wherein the cyclic ester ($b_1$) is ε-caprolactone; and the antistatic molded article comprising a polyesteramide resin, wherein the cyclic amide (a) is ε-caprolactam.

Further, the present invention relates to a polyesteramide resin prepared by reacting 100 parts by weight of (a) a cyclic amide, 5 to 50 parts by weight of ($b_2$) at least one linear ester selected from the group consisting of polyesterpolyol, polyesteretherpolyol, and polycarbonatepolyol, or 5 to 50 parts by weight of a mixture of at least 5 parts by weight of the linear ester ($b_2$) and ($b_1$) a cyclic ester, and (c) a chemical compound having a molecular weight of 200 or smaller and having at least 2 hydroxyl groups, wherein said resin has a number average molecular weight, reduced from polystyrene, of from 4,000 to 100,000.

Preferred embodiments of the above polyesteramide resin are as follows:

the polyesteramide resin, wherein said polyesteramide resin has the surface resistivity of from $10^6$ to $10^9 \Omega$;

the polyesteramide resin, wherein said polyesteramide resin has a volume resistivity of from $10^4$ to $10^7 \Omega.m$.;

the polyesteramide resin, wherein the chemical compound (c) is used in such an amount that a molar ratio of the hydroxyl groups, defined by the following equation, is in a range of from 0.1 to 1.0, wherein the molar ratio of the hydroxyl groups=molar amount of the hydroxyl group of the chemical compound (c)/molar amount of the hydroxyl group of the linear ester ($b_2$);

the polyesteramide resin, wherein the molar ratio of the hydroxyl groups is in the range of from 0.2 to 0.5;

the polyesteramide resin, wherein the chemical compound (c) has at least 3 hydroxyl groups;

the polyesteramide resin, wherein the chemical compound (c) is trimethylolethane, trimethylolpropane or a mixture of trimethylolethane and trimethylolpropane;

the polyesteramide resin, wherein the cyclic amide (a) is ε-caprolactam;

the polyesteramide resin, wherein the cyclic ester ($b_1$) is ε-caprolactone;

the polyesteramide resin, wherein the linear ester ($b_2$) is polycaprolactonediol; and an antistatic molded article comprising the above mentioned polyesteramide resin.

Any one of the above-mentioned molded article is prepared preferably by a monomer casting method.

Further, the present invention is a method for preparing an antistatic polyesteramide resin by ring-opening copolymerizing (a) a cyclic amide and ($b_1$) a cyclic ester in a weight ratio of from 100:3 to 100:44.

In the above method, it is preferred that the cyclic amide (a) and the cyclic ester ($b_1$) are ring-opening copolymerized in a weight ratio of from 100:10 to 100:34.

Still further, the present invention is a method for preparing an antistatic polyesteramide resin by copolymerizing (a) a cyclic amide and ($b_2$) at least one linear ester selected from the group consisting of polyesterpolyol, polyesteretherpolyol, and polycarbonatepolyol or a mixture of the linear ester ($b_2$) and ($b_1$) a cyclic ester, in a weight ratio of from 100:2 to 100:50.

In the above method, it is preferred that the cyclic amide (a) and the linear ester ($b_2$) or the mixture of the linear ester ($b_2$) and the cyclic ester ($b_1$) are copolymerized in a weight ratio of from 100:5 to 100:45. It is also preferred that either the linear ester ($b_2$) is polycaprolactonediol; that the cyclic ester ($b_1$) is ε-caprolactone; and that the cyclic amide (a) is ε-caprolactam.

Further, the present invention is a method for preparing a polyesteramide resin by reacting 100 parts by weight of (a) a cyclic amide, 5 to 50 parts by weight of ($b_2$) at least one linear ester selected from the group consisting of polyesterpolyol, polyesteretherpolyol, and polycarbonatepolyol, or 5 to 50 parts by weight of a mixture of ($b_2$) at least 5 parts by weight of the linear ester and ($b_1$) a cyclic ester, and (c) a chemical compound having a molecular weight of 200 or smaller and having at least 2 hydroxyl groups.

The preferred embodiments of the above method are as follows:

the method for preparing a polyesteramide resin, wherein the chemical compound (c) is reacted in such an amount that the molar ratio of the hydroxyl groups, defined by the following equation, is in the range of from 0.1 to 1.0, wherein the molar ratio of the hydroxyl groups=molar amount of the hydroxyl group of the chemical compound (c)/molar amount of the hydroxyl group of the linear ester ($b_2$);

the method for preparing a polyesteramide resin, wherein the molar ratio of the hydroxyl group is in the range of from 0.2 to 0.5;

the method for preparing a polyesteramide resin, wherein the chemical compound (c) has at least 3 hydroxyl groups;

and the method for preparing a polyesteramide resin, wherein the chemical compound (c) is trimethylolethane, trimethylolpropane of a mixture of trimethylolethane and trimethylolpropane.

In any one of the above methods, it is preferred that either the cyclic amide (a) is ε-caprolactam; that the cyclic ester ($b_1$) is ε-caprolactone; and that the linear ester ($b_2$) is polycaprolactonediol.

It is preferred that a monomer casting method is used for the copolymerization in any one of the above-mentioned methods.

Further, the present invention is a method for making a polyesteramide resin antistatic, wherein the polyesteramide resin molded article is prepared by ring-opening copolymerizing (a) a cyclic amide and ($b_1$) a cyclic ester, characterized in that the ratio of the cyclic amide (a) to the cyclic ester ($b_1$) is set in a range of from 100:3 to 100:44.

In the above method, it is preferred that the ratio of the cyclic amide (a) to the cyclic ester ($b_1$) is set in a range of from 100:10 to 100:34.

Still further, the present invention is a method for making a polyesteramide resin antistatic, wherein the polyesteramide resin is prepared by copolymerizing (a) a cyclic amide and ($b_2$) at least one linear ester selected from the group consisting of polyesterpolyol, polyesteretherpolyol and polycarbonatepolyol or a mixture of the linear ester ($b_2$) and ($b_1$) a cyclic ester, characterized in that the weight ratio of the cyclic amide (a) to the linear ester ($b_2$) or to the mixture of the cyclic ester ($b_1$) and the linear ester ($b_2$) is set in a range of from 100:2 to 100:50.

In the above method, it is preferred that the weight ratio of the cyclic amide (a) to the linear ester ($b_2$) or the mixture of the cyclic ester ($b_1$) and the linear ester ($b_2$) is set in a range of from 100:5 to 100:45.

The present invention also relates to a method for making a polyesteramide resin antistatic, wherein the polyesteramide resin is prepared by copolymerizing (a) a cyclic amide and ($b_2$) at least one linear ester selected from the group consisting of polyesterpolyol, polyesteretherpolyol or a mixture of the linear ester ($b_2$) and ($b_1$) a cyclic ester, characterized in that the weight ratio of the cyclic amide (a) to the linear ester ($b_2$) is set in the range of from 100:5 to 100:50, or the weight ratio of the cyclic amide (a) to the mixture of the linear ester ($b_2$) and the cyclic ester ($b_1$) is set in the range of from 100:5 to 100:50, wherein the weight ratio of the linear ester ($b_2$) to the cyclic amide (a) is at least 5:100, and (c) a chemical compound having a molecular weight of 200 or smaller and having at least 2 hydroxyl groups.

The preferred embodiments of the above method are as follows:

the method for making the polyesteramide resin antistatic, wherein the chemical compound (c) is added in such an amount that the molar ratio of the hydroxyl groups, defined by the following equation, is in the range of from 0.1 to 1.0, wherein the molar ratio of the hydroxyl groups=molar amount of the hydroxyl group of the chemical compound (c)/molar amount of the hydroxyl group of the linear ester ($b_2$);

the method for making the polyesteramide resin antistatic, wherein the molar ratio of the hydroxyl groups is in the range of from 0.2 to 0.5;

the method for making the polyesteramide resin antistatic, wherein the chemical compound (c) has at least 3 hydroxyl groups; and the method for making the polyesteramide resin antistatic, wherein the chemical compound (c) is trimethylolethane, trimethylolpropane or a mixture of trimethylolethane and trimethylolpropane.

In any one of the above methods for making a polyesteramide resin antistatic, it is preferred that either the cyclic amide (a) is ε-caprolactam; that the cyclic ester ($b_1$) is ε-caprolactone; and that the linear ester ($b_2$) is polycaprolactonediol.

It is preferred that a monomer casting method is used to prepare a polyesteramide resin in any one of the above-mentioned methods for making the polyesteramide resin antistatic.

EMBODIMENTS OF THE INVENTION

The antistatic property in the present invention means that the surface resistivity of a molded resin article, measured according to the Japanese Industrial Standards (JIS) K6911, is smaller than $10^{13}\Omega$ (i.e., an order of $10^{12}\Omega$ or smaller). Especially, in applications in the production of semiconductor-related products, a molded resin article preferably has a surface resistivity of an order of from $10^6$ to $10^{12}\Omega$, more preferably $10^6$ to $10^{10}\Omega$.

Further, the present molded resin article is characterized in that its volume resistivity, measured according to JIS K6911, is less than $10^{11}\Omega$.m, preferably from $10^4$ to $10^8\Omega$.m. It is usually sufficient that a molded article has the antistatic property only on a surface, so that, in some cases, the article is provided with the antistatic property only on its surface. The present molded resin article, on the other hand, also has a low volume resistivity, and, consequently, has the antistatic property in every part.

In the present invention, the surface or volume resistivity is measured according to JIS K6911 as described above. It should be noted that, in the measurements in the present invention, an electrically conductive rubber or paint as specified in JIS K6911 is not used, but the molded article is directly placed between electrodes of a cell chamber, which results in a higher contact resistance than in the case where the above-mentioned electrically conductive rubber or paint is used. If the measurements were made exactly in the manner specified in JIS K6911, a lower resistivity value would be obtained. The measurements are made at 500 V in accordance with JIS K6911, but the resistivity of the present molded resin article can be measured even at 15 V, and the present molded resin article is characterized in that the resistivity is almost constant even if the applied voltage is varied in a range of from 15 V to 500 V.

Further, in the present invention, the antistatic property is evaluated by a half-value period determined by measuring the charged-voltage decay. The half-value period is the time required for the charged electric voltage to reduce to a half, and is a measure of the diffusion property of static electricity of a molded resin article. The half-value period of a molded article is preferably 2 seconds or shorter for a molded resin article to be viewed as antistatic.

The polyesteramide in the present invention is prepared by copolymerizing (a) a cyclic amide and ($b_1$) a cyclic ester and/or ($b_2$) a linear ester.

Examples of the cyclic amide (a) that can be used in the present invention include ω-lactam of the carbon number of from 4 to 12, including γ-butyrolactam, ε-caprolactam, ω-enantholactam, ω-caprylolactam, and ω-laurolactam. Especially preferred is ε-caprolactam. These cyclic amides can be used individually or as a mixture of two or more of them.

Examples of the cyclic ester ($b_1$) that can used in the present invention include ω-lactone of the carbon number of from 3 to 12, β-propiolactone, β-butyrolactone, β-valerolactone, δ-valerolactone, β-methyl-δ-valerolactone, δ-caprolactone, ε-caprolactone, α-methyl-ε-caprolactone, ω-enantholactone, ω-caprylolactone, and ω-laurolactone. Especially preferred is ε-caprolactone. These cyclic esters can be used individually or as a mixture of two or more of them.

The linear ester ($b_2$) is at least one selected from the group consisting of polyesterpolyol, polyesteretherpolyol, and polycarbonatepolyol.

Examples of the polyesterpolyol include those prepared by a dehydration condensation reaction of an aliphatic dicarboxylic acid such as succinic acid, adipic acid, sebacic acid, and azelaic acid, aromatic dicarboxylic acid such as phthalic acid, terephthalic acid, isophthalic acid, and naphthalene dicarboxylic acid, and alicyclic dicarboxylic acid such as hexahydrophthalic acid, hexahydroterephthalic acid and hexahydroisophthalic acid, or esters thereof, or acid anhydrides thereof, with ethyleneglycol, 1,3-propyleneglycol, 1,2-propyleneglycol, 1,3-butanediol, 1,4-butanediol, 1,5-pentanediol, 1,6-hexanediol, 3-methyl-1,5-pentanediol, neopentylglycol, 1,8-octanediol, 1,9-nonanediol, or a mixture thereof; and polylactonediol prepared by ring-opening copolymerization of a lactone monomer such as ε-caprolactone. Among them, polycaprolactonediol is preferably used, particularly polycaprolactonediol having a molecular weight of from about 500 to 2,000.

Examples of the polycarbonatepolyol include those prepared by reacting at least one polyhydric alcohol such as ethyleneglycol, 1,3-propyleneglycol, 1,2-propyleneglycol, 1,3-butanediol, 1,4-butanediol, 1,5-pentanediol, 1,6-hexanediol, 3-methyl-1,5-pentanediol, neopentylglycol, 1,8-octanediol, 1,9-nonanediol, and diethyleneglycol, with diethylene carbonate, dimethyl carbonate, diethyl carbonate or the like.

Examples of the polyesteretherpolyol include those prepared by a dehydration condensation reaction of an aliphatic dicarboxylic acid such as succinic acid, adipic acid, sebacic acid, and azelaic acid, aromatic dicarboxylic acid such as phthalic acid, terephthalic acid, isophthalic acid, and naphthalene dicarboxylic acid, and alicyclic dicarboxylic acid such as hexahydrophthalic acid, hexahydroterephthalic acid and hexahydroisophthalic acid, or esters thereof, or acid anhydrides thereof, with a glycol, such as diethyleneglycol, and propylene oxide adducts or a mixture thereof. These linear esters can be used individually or as a mixture of two or more of them.

Hereinafter, unless otherwise specified, the amount of each of the above-described ester is expressed as a weight ratio of the ester per 100 weight units of the cyclic amide (a) in total. The weight ratio of the cyclic ester ($b_1$) is in a range of from 3 to 44, preferably from 10 to 34. If the amount of the cyclic ester is less than the above-described lower limit, the required amount of additional electrically conductive material is so large that the disadvantages of conventional technologies emerge. When the weight ratio of the cyclic ester is in the range of from 3 to less than 10, an electrically conductive material such as graphite and carbon black is added or applied on the surface to attain the desired surface resistivity. In that case, a resistivity less than $10^{13}\Omega$ can be attained by adding the conductive material, usually, in an amount of 10 wt %, preferably less than 5 wt %, relative to a molded article, which amount of the addition is significantly smaller than the conventionally required amount. When the weight ratio of the cyclic ester is 10 or more, the desired resistivity is immediately attained without adding an electrically conductive material. Even if the amount of the cyclic ester is larger than the above-mentioned upper limit, there is no problem with the antistatic property, but, in some cases, the mechanical strength or the heat resistance of the molded resin article decreases significantly, or fine bubbles are contained in the molded article, so that the molded article cannot be used as a structural material. Consequently, the weight ratio of the cyclic ester is preferably in the range of from 10 to 34, particularly from 19 to 34. When ϵ-caprolactone is used as the cyclic ester in a weight ratio in the range of from 19 to 24, the surface resistivity is $10^{10}\Omega$; and in the range of 24 or higher, the surface resistivity is constant at $10^9\Omega$, irrespective of the weight ratio.

The amount of the linear ester ($b_2$), expressed in the weight ratio per 100 weight units of the cyclic amide (a), is in the range of from 2 to 50, preferably from 5 to 45, more preferably from 10 to 40. If the amount of the linear ester is less than the above-described lower limit, the required amount of additional electrically conductive material is so large that the disadvantages of conventional technologies emerge. When the weight ratio is in the range of from 2 to less than 5, an electrically conductive material such as graphite and carbon black is added or applied on the surface to attain the desired surface resistivity, but an amount of less than 10 wt % relative to the molded article is usually enough. When the weight ratio is 5 or more, the resistivity of less than $10^{13}\Omega$ is immediately attained without adding an electrically conductive material. Even if the amount of the linear ester is larger than the above-mentioned upper limit, there is no problem in the antistatic property, but the same problems as mentioned above concerning the cyclic ester ($b_1$) may occur.

When a mixture of the cyclic ester ($b_1$) and the linear ester ($b_2$) is used, their total amount per 100 weight units of the cyclic amide (a) is in the range of from 2 to 50, preferably from 5 to 45, more preferably from 10 to 40, as in the case of the above-described linear ester ($b_2$) is used. The ratio between the cyclic ester ($b_1$) and the linear ester ($b_2$) is not limited and can be determined at will, based on a releasing property from a mold or a desired tensile strength of a molded article.

The present antistatic molded article comprising a polyesteramide resin preferably has a tensile strength, determined according to ASTM D-638, of 40 MPa or higher, more preferably 55 Mpa or higher, most preferably 70 MPa or higher, so that it may be used as a structural material. In that case, the molded article may be treated by heating at about 170° C. for about 3 hours, which method is conventionally practised to remove strain and the like from the material.

The present invention relates also to a polyesteramide resin prepared by reacting 100 parts by weight of (a) a cyclic amide, 5 to 50 parts by weight of ($b_2$) at least one linear ester selected from the group consisting of polyesterpolyol, polyesteretherpolyol, and polycarbonatepolyol, or 5 to 50 parts by weight of a mixture of at least 5 parts by weight of the linear ester ($b_2$) and ($b_1$) a cyclic ester, and (c) a chemical compound having a molecular weight of 200 or smaller and having at least 2 hydroxyl groups. The resin preferably has a number average molecular weight, reduced from polystyrene, of from about 4,000 to about 100,000, more preferably from 5,000 to 50,000, as measured by GPC (SSC-7100 chromatograph, ex. Sensyu Kagaku Co.; column:GPC-3506; detector: a differential refractometer; column temperature: 150° C.; eluent: m-cresol; flow rate: 0.5 ml/min). Surprisingly, the polyesteramide resin has a lower surface resistivity than the aforesaid $10^9$ to $10^{12}\Omega$, i.e., a surface resistivity of from $10^6$ to $10^9\Omega$ and a volume resistivity of from $10^4$ to $10^7\Omega$.m. In addition, it has a good elastic recovery property, a noise extinction property, and a low-temperature property.

Examples of a chemical compound (c) having a molecular weight of 200 or smaller and having at least 2 hydroxyl groups include ethyleneglycol, 1,3-propyleneglycol, 1,2-propyleneglycol, 1,4-butanediol, 1,3-butanediol, 1,5-pentanediol, neopentylglycol, trimethylolethane, trimethylolpropane, glycerol, and diethyleneglycol. These compounds can be used individually or as a mixture. Preferably, a compound having at least 3 hydroxyl groups is used and particularly trimethylolethane and/or trimethylolpropane is preferably used.

Preferably, the chemical compound (c) is used in the reaction in such an amount that the molar ratio of the hydroxyl groups, defined by the following equation, is in the range of from 0.1 to 1.0, more preferably from 0.2 to 0.5:

the molar ratio of the hydroxyl groups molar amount of the hydroxyl group of (c)/molar amount of the hydroxyl group of ($b_2$).

If the ratio is less than 0.1, the effect of reducing the resistivity is not sufficiently attained. Meanwhile, if the ratio is more than 1, the copolymerization reaction does not proceed sometime.

The molded resin article of the present invention can be prepared by a usual method of anionic polymerization. For example, the molded article conforming to a size of a mold can be obtained in one step by a monomer casting method.

A The temperature for the anionic polymerization is generally between 80 and 200° C., preferably between 85 and 185° C.

Polymerization catalyst and polymerization co-catalyst may be those which are commonly used for anionic polymerization. Examples of the polymerization catalyst include an alkali metal, an alkali earth metal, and a hydride, an oxide, a hydroxide, a carbonate, an alkylate, an alkoxide, and a Grignard compound of these metals and their reaction products with ω-lactam, more specifically, lithium, sodium, potassium, magnesium, calcium, lithium hydride, sodium hydride, potassium hydride, sodium oxide, potassium oxide, sodium hydroxide, potassium hydroxide, sodium carbonate, potassium carbonate, methyl sodium, ethyl sodium, methyl potassium, ethyl potassium, sodium methylate, sodium ethylate, potassium methylate, potassium ethylate, methyl magnesium bromide, and ethyl magnesium bromide. These polymerization catalysts can be used individually or as a mixture of two or more of them. The amount to be added is normally in a range of from about $4\times10^{-3}$ to 3 wt % based on the total weight of the cyclic amide (a) and the cyclic ester ($b_1$) and/or the linear ester ($b_2$).

Examples of the co-catalyst or the reaction initiator include isocyanates, acyllactams, carbamidelactams, isocyanurate derivatives, acid halides, and urea derivatives, more specifically, n-butyl isocyanate, phenyl isocyanate, octyl isocyanate, toluene diisocyanate, isophorone diisocyanate, 1,6-hexamethylene diisocyanate, trimethyl hexamethylene diisocyanate, m-xylene diisocyanate, 4,4'-di phenylmethane diisocyanate, N-acetyl-Ω-caprolactam, 1,6-hexamethylenebiscarbamide caprolactam, triaryl isocyanurate, terephthaloyl chloride, and 1,3-diphenylurea. These polymerization co-catalysts can be used individually or as a mixture of two or more of them.

When the cyclic ester ($b_1$) is used as the ester, the amount of the co-catalyst or the reaction initiator to be added is in a range of from 0.01 to 4.0 wt %, based on a total weight of the cyclic amide (a) and the cyclic ester ($b_1$). When the linear ester ($b_2$) is used, diisocyanate such as toluene diisocyanate is preferably used as the co-catalyst. In that case, the amount of the diisocyanate to be added is determined depending on the linear ester ($b_2$), but typically in a range, expressed in the molar ratio of isocyanate groups of the diisocyanate to hydroxyl groups of the ester, of from 0.6/1.0 to 1.2/1.0, in addition to the above-mentioned amount of from 0.01 to 4 wt %.

Besides the cyclic amide and the linear ester, other monomers such as a dicarboxylic acid, a diamine, a diol, and an amino acid, or derivatives thereof may be optionally added in such an amount that the antistatic property of the molded article is not spoiled, in the preparation of the present antistatic polyesteramide resin.

In the present invention, in addition to the above-mentioned substances, additives such as pigments, dyes, reinforcing materials, and antimicrobials can be added as required. Further, electrically conductive fillers and electrically conductive polymers may be added and antistatic agents may be applied by coating.

EXAMPLES

The present invention will be further explained in reference to the following examples.

Measurement Methods (1) Surface Resistivity (Ω) and Volume Resistivity (Ω.m)

A test peace of 100 square mm with 5 mm thickness was prepared and vacuum-dried at 105° C. to remove influence of moisture. The test peace was placed in a test peace chamber, Resistivity Chamber R12704A, ex. Advantest Co., and the surface resistivity (in Ω) and the volume resistivity (in Ω.m) were measured according to the Japanese Industry Standards (JIS) K 6911 at 500 V with a digital ultra-high resistance/micro current meter, R8340A, ex. Advantest Co.

(2) Charged-Voltage Decay

A test peace of 40 square mm by 10 mm thickness was prepared and vacuum-dried at 105° C. to remove influence of moisture. The half-value period was determined according to JIS L1094 as the time in which the applied voltage of 10 kV reduced to a half, with a potential attenuation testing instrument, Static Honestmeter, ex. Shishido Electrostatic, Ltd., and an automatic half-value multi monitor, Honest Analyzer, ex. Shishido Electrostatic, Ltd.

(3) Tensile Strength

Tensile strength was measured according to ASTM D-638.

Example I

In a 1-liter flask, 600 g of anhydrous ϵ-caprolactam and 154 g of anhydrous ϵ-caprolactone were placed and heated to 140–150° C., to which 3.1 g of toluene diisocyanate as the co-catalyst was added and mixed. Meanwhile, in a 500-milliliter flask, 200 g of anhydrous ϵ-caprolactam was placed, to which 1.4 g of sodium hydride (63% in oil) as the polymerization catalyst was added and the temperature was adjusted to 140–150° C. The total amount of ϵ-caprolactam was 800 g and therefore the weight ratio of ϵ-caprolactone to ϵ-caprolactam was about 19/100. Then, these two liquids were mixed, and injected in a 200 mm×200 mm×30 mm rectangular mold, which mold was preheated at 155° C. After being polymerized for 30 minutes, a molded article was taken out. From the molded article, test pieces for measuring the surface resistivity were prepared and subjected to the measurements. The surface resistivity was $10^{10}\Omega$, the half-value period was 0.6 second, and the tensile strength was 50 MPa.

Example II

Example I was repeated except that the amount of ϵ-caprolactam initially fed in the flask was changed to 680 g; the amount of ϵ-caprolactone to 88 g; the amount of toluene diisocyanate to 2.7 g; and the amount of sodium hydride to 1.2 g. The total amount of ϵ-caprolactam was 880 g and therefore the weight ratio of ϵ-caprolactone to ϵ-caprolactam was 10/100. The surface resistivity of the molded article was $3\times10^{12}\Omega$, the half-value period was 0.9 second, and the tensile strength was 62 MPa.

Example III

Example I was repeated except that the amount of ϵ-caprolactam initially fed in the flask was changed to 660 g; the amount of ϵ-caprolactone to 107 g; the amount of toluene diisocyanate to 2.7 g; and the amount of sodium hydride to 1.2 g. The total amount of ϵ-caprolactam was 860 g, and therefore the weight ratio of ϵ-caprolactone to ϵ-caprolactam was about 12/100. The surface resistivity of the molded article was $5\times10^{11}\Omega$ and the half-value period was 0.8 second.

Example IV

Example I was repeated except that the amount of ϵ-caprolactam initially fed in the flask was changed to 550 g; the amount of ϵ-caprolactone to 190 g; the amount of toluene diisocyanate to 3.4 g; and the amount of sodium hydride to 1.5 g. The total amount of ϵ-caprolactam was 750 9 and therefore the weight ratio of ϵ-caprolactone to ϵ-caprolactam was about 25/100. The surface resistivity of the molded article was $8\times10^{9}\Omega$ and the half-value period was 0.5 second.

Example V

Example I was repeated except that the amount of ϵ-caprolactam initially fed in the flask was changed to 540 g; and the amount of ϵ-caprolactone to 220 g; 1.8 g of hexamethylene diisocyante was used instead of toluene diisocyanate; and the amount of sodium hydride was changed to 0.82 g. The total amount of ϵ-caprolactam was 740 g and therefore the weight ratio of ϵ-caprolactone to ε-caprolactam was about 30/100. The surface resistivity of the molded article was $5\times10^9\Omega$ and the half-value period was 0.2 second.

Example VI

Example I was repeated except that the amount of ε-caprolactam initially fed in the flask was changed to 510 g; and the amount of ε-caprolactone to 250 g; 1.6 g of hexamethylene diisocyante was used instead of toluene diisocyanate; and the amount of sodium hydride was changed to 0.71 g. The total amount of ε-caprolactam was 710 g and therefore the weight ratio of ε-caprolactone to ε-caprolactam was about 35/100. The surface resistivity of the molded article was $7\times10^9\Omega$ and the half-value period was 0.4 second. The molded article contained a few small bubbles.

Example VII

Example 1 was repeated except that the amount of ε-caprolactam initially fed in the flask was changed to 680 g; the amount of ε-caprolactone to 37 g; the amount of toluene diisocyanate to 3.4 g; and the amount of sodium hydride to 1.5 g; and 32 g of graphite was added to the mixture in the flask. The total amount of ε-caprolactam was 880 g and therefore the weight ratio of ε-caprolactone to ε-caprolactam was about 4/100. The surface resistivity of the molded article was $2\times10^{11}\Omega$ and the half-value period was 0.8 second.

Example VIII

In a 1-liter flask, 500 g of anhydrous Ω-caprolactam and 210 g (weight ratio of 30) of anhydrous polycaprolactonediol (Placcel 205, Mw. 530, ex. Daicell Chemical Co.) were placed and heated to 140–150° C., to which 54 g of hexamethylene diisocyanate as the polymerization co-catalyst was added and mixed. Meanwhile, in a 500-milliliter flask, 200 g of anhydrous ε-caprolactam was placed, to which 1.4 g of sodium hydride(63% in oil) as the polymerization catalyst was added and the temperature was adjusted to 140–150° C. The total amount of ε-caprolactam was 700 g and therefore the weight ratio of polycaprolactonediol to ε-caprolactam was 30/100. Then, these two liquids were mixed, and injected in a 200 mm×200 mm×30 mm rectangular mold, which mold was preheated at 155° C. After being polymerized for 30 minutes, a molded article was taken out. From the molded article, test pieces were prepared and the surface resistivity and the half-value period were measured. The surface resistivity was $7\times10^{10}\Omega$ and the half-value period was 0.6 second.

Example IX

Example VIII was repeated except that the amount of ε-caprolactam initially fed in the flask was changed to 640 g; the amount of polycaprolactonediol to 42 g; the amount of hexamethylene diisocyanate to 10 g; and the amount of sodium hydride to 0.9 g. The total amount of ε-caprolactam was 840 g and the weight ratio of polycaprolactonediol to ε-caprolactam was 5/100. The surface resistivity of the molded article was $2\times10^{12}\Omega$, the half-value period was 1.7 seconds, and the tensile strength was 77 MPa.

Example X

Example VIII was repeated except that the amount of ε-caprolactam initially fed in the flask was changed to 440 g; the amount of polycaprolactonediol to 288 g; the amount of hexamethylene diisocyanate to 71 g; and the amount of sodium hydride to 1.7 g. The total amount of ε-caprolactam was 640 g and therefore the weight ratio of polycaprolactonediol to ε-caprolactam was 45/100. The surface resistivity of the molded article was $9\times10^9\Omega$ and the half-value period was 0.5 second.

Example XI

Example VIII was repeated except that the amount of ε-caprolactam initially fed in the flask was changed to 650 g; the amount of polycaprolactonediol to 17 g; and the amount of hexamethylene diisocyanate to 5 g; and 35 g of graphite was added to the mixture in the flask and mixed. The total amount of ε-caprolactam was 850 g and therefore the weight ratio of polycaprolactonediol to ε-caprolactam was 2/100. The surface resistivity of the molded article was $3\times10^{11}\Omega$ and the half-value period was 1.2 seconds.

Example XII

In a 1-liter flask, 540 g of anhydrous ε-caprolactam, 37 g of anhydrous polycaprolactonediol (Placcel 205, Mw. 530, ex. Daicell Chemical Co.) and 111 g of ε-caprolactone were placed and heated to 140–150° C., to which 10 g of hexamethylene diisocyanate as the polymerization co-catalyst was added and mixed. Meanwhile, in a 500-milliliter flask, 200 g of anhydrous ε-caprolactam was placed, to which 1.1 g of sodium hydride (63% in oil) as the polymerization catalyst was added and the temperature was adjusted to 140–150° C. The total amount of ε-caprolactam was 740 g and, therefore, the weight ratio of polycaprolactonediol to ε-caprolactam was 5/100 and the weight ratio of ε-caprolactone to ε-caprolactam was 15/100. Then, these two liquids were mixed, and injected in a 200 mm×200 mm×30 mm mold, which mold was preheated at 155° C. After being polymerized for 30 minutes, a molded article was taken out. From the molded article, test pieces were prepared and the surface resistivity and so on were measured. The surface resistivity was $1\times10^{10}\Omega$, the half-value period was 0.5 second and the tensile strength was 48 MPa.

Example XIII

Example XII was repeated except that the amount of ε-caprolactam initially fed in the flask was changed to 620 g; and the amount of ε-caprolactone to 16.4 g; and 11 g of toluene diisocyanate was added instead of hexamethylene diisocyanate. The total amount of ε-caprolactam was 820 g and, therefore, the weight ratio of polycaprolactonediol to ε-caprolactam was 5/100 and the weight ratio of ε-caprolactone to ε-caprolactam was 2/100. The surface resistivity of the molded article was $8\times10^{11}\Omega$, the half-value period was 1.6 seconds and the tensile strength was 76 MPa.

Example XIV

Example XII was repeated except that the amount of ε-caprolactam initially fed in the flask was changed to 400 g; the amount of polycaprolactonediol to 120 g; the amount of ε-caprolactone to 150 g; the amount of hexamethylene diisocyanate to 35 g; and the amount of sodium hydride to 1.5 g. The total amount of ε-caprolactam was 600 g and, therefore, the weight ratio of polycaprolactonediol to ε-caprolactam was 20/100 and the weight ratio of ε-caprolactone to ε-caprolactam was 25/100. The surface resistivity of the molded article was $8\times10^9\Omega$, and the molded article was not electrostatically charged in the measurement of the half-value period.

Example XV

Example XII was repeated except that the amount of ε-caprolactam initially fed in the flask was changed to 650 g; the amount of polycaprolactonediol to 8.5 g; the amount of ε-caprolactone to 17 g; the amount of hexamethylene diisocyanate to 3 g; and the amount of sodium hydride to 1.4 g; and 32 g of graphite was added to the mixture in the flask and mixed. The total amount of ε-caprolactam was 850 g and, therefore, the weight ratio of polycaprolactonediol to ε-caprolactam was 1/100 and the weight ratio of ε-caprolactone to ε-caprolactam was 2/100. The surface resistivity of the molded article was $4 \times 10^{11} \Omega$, and the half-value period was 1.5 seconds.

Example XVI

In a 1-liter flask, 500 g of anhydrous ε-caprolactam, 105 g of anhydrous polycaprolactonediol (Placcel 205, Mw. 530, ex. Daicell Chemical Co.) and 6 g of trimethylolpropane were placed and heated to 140–150° C., to which 44 g of hexamethylene diisocyanate was added and mixed. Meanwhile, in a 500-milliliter flask, 200 g of anhydrous ε-caprolactam was placed, to which 1 g of sodium hydride (63% in oil) as the polymerization catalyst was added and heated to 135–145° C. The total amount of ε-caprolactam was 700 g and, therefore, the weight ratio of polycaprolactonediol to ε-caprolactam was 15/100. Then, these two liquids were mixed, and injected in a 200 mm×200 mm×30 mm mold, which mold was preheated at 155° C. After being polymerized for 30 minutes, a molded article was taken out. From the molded article, test pieces were prepared and the surface resistivity, volume resistivity and charged-voltage decay were measured. The surface resistivity was $2 \times 10^6 \Omega$, and the volume resistivity was $3 \times 10^4 \Omega.m$. In the measurement of the half-value period, the molded article was not electrostatically charged.

Example XVII

Example XVI was repeated except that the amount of polycaprolactonediol initially fed in the 1-liter flask was changed to 35 g; the amount of trimethylolpropane to 3 g; and the amount of hexamethylene diisocyanate to 17 g; and 70 g of ε-caprolactone was further added. The total amount of ε-caprolactam was 700 g and, therefore, the weight ratio of polycaprolactonediol to ε-caprolactam was 5/100 and the weight ratio of ε-caprolactone to ε-caprolactam was 10/100. The surface resistivity was $4 \times 10^6 \Omega$, and the volume resistivity was $5 \times 10^4 \Omega.m$. In the measurement of the half-value period, the molded article was not electrostatically charged.

Comparative Experiment A

Example I was repeated except that no ester was added; the amount of ε-caprolactam initially fed in the flask was changed to 780 g; the amount of hexamethylene diisocyanate to 2.1 g; and the amount of sodium hydride to 1.0 g. The surface resistivity of the molded article was $9 \times 10^{14} \Omega$, and the half-value period was 56 seconds.

Example XVIII

Example XVI was repeated except that no trimethylolpropane was added. The surface resistivity of the molded article was $1 \times 10^{11} \Omega$, the volume resistivity was $2 \times 10^9 \Omega.m$, and the half-value period was 1.2 seconds.

TABLE I

| Example/comp. exp | ester/amide | S.R. ($\Omega$) | V.R. ($\Omega.m$) | H.V. (sec) | T.S. (MPa) |
|---|---|---|---|---|---|
| I | 19/100 | $10^{10}$ | — | 0.6 | 50 |
| II | 10/100 | $3 * 10^{12}$ | — | 0.9 | 62 |
| III | 12/100 | $5 * 10^{11}$ | — | 0.8 | — |
| IV | 25/100 | $8 * 10^9$ | — | 0.5 | — |
| V | 30/100 | $5 * 10^9$ | — | 0.2 | — |
| VI | 35/100 | $7 * 10^9$ | — | 0.4 | — |
| VII | 4/100 | $2 * 10^{11}$ | — | 0.8 | — |
| VIII | 30/100 | $7 * 10^{10}$ | — | 0.6 | — |
| IX | 5/100 | $2 * 10^{12}$ | — | 1.7 | 77 |
| X | 45/100 | $9 * 10^9$ | — | 0.5 | — |
| XI | 2/100 | $9 * 10^{11}$ | — | 1.2 | — |
| XII | 20/100 | $1 * 10^{10}$ | — | 0.5 | 48 |
| XIII | 7/100 | $8 * 10^{11}$ | — | 1.6 | 76 |
| XIV | 45/100 | $8 * 10^9$ | — | 0 | — |
| XV | 3/100 | $4 * 10^{11}$ | — | 1.5 | — |
| XVI | 15/100 | $2 * 10^6$ | $3 * 10^4$ | 0 | — |
| XVII | 15/100 | $4 * 10^6$ | $5 * 10^4$ | 0 | — |
| XVIII | 15/100 | $2 * 10^9$ | $2 * 10^9$ | 1.2 | — |
| A | 0 | $9 * 10^{14}$ | — | 56 | — |

S.R. = surface resistivity
V.R. = volume resistivity
H.V. = half-value period
T.S. = tensile strength As shown above, the molded resin articles prepared by using the cyclic and/or linear ester in a specified weight ratio to the cyclic amide show a surface resistivity of less than $10^{13} \Omega$. The molded resin articles in Examples VII, XI and XV, where the weight ratio of the ester to the amide is 4 or lower, a surface resistivity of less than $1 \times 10^{12} \Omega$ was attained by adding graphite in an amount of less than 5 wt % of the weight of the molded article. Further, all of the molded resin articles according to the present invention show a half-value period of less than 2 seconds. On the other hand, the resin in Comparative experiment A, which does not contain the ester component, shows a larger surface resistivity and a larger half-value period.

Further, the molded resin articles prepared in Examples XVI and XVII by reacting trimethylolpropane in addition to the cyclic amide, the cyclic ester and the linear ester show a surface resistivity of an order of $10^6 \Omega$ and a volume resistivity of an order of $10^4 \Omega.m$.

Effects of the Invention

In the molded article comprising a polyesteramide resin according to the present invention, the resin itself has a low resistivity, so that the molded article is economical and suited to be used in the IC-related field, because it does not have a problem of extraction of ionic contaminants. Further, the present molded resin article can be prepared easily.

The polyesteramide resin prepared by reacting a chemical compound having at least two hydroxyl groups, like trimethylolpropane, in addition to the cyclic amide, the cyclic ester and/or the linear ester shows a low surface resistivity of an order of $10^6 \Omega$, and, therefore, is useful for applications where an antistatic property is more severely required.

What is claimed is:

1. An antistatic molded article comprising a polyesteramide resin, wherein said molded article is prepared by copolymerizing a cyclic amide and at least one cyclic ester, said molded article having a surface resistivity of less than $10^{13} \Omega$.

2. The antistatic molded article according to claim 1 wherein the surface resistivity is in a range of from $10^9$ to $10^{12} \Omega$.

3. The antistatic molded article according to claim 1 wherein said molded article is prepared by ring-opening copolymerizing the cyclic amide and the cyclic ester in a weight ratio of from 100:3 to 100:44.

4. The antistatic molded article according to claim 3, wherein said molded article is prepared by copolymerizing the cyclic amide and the cyclic ester in a weight ratio of from 100:3 to 100: less than 10, wherein an electrically conductive material is further provided.

5. The antistatic molded article according to claim 3, wherein said molded article is prepared by ring-opening copolymerizing the cyclic amide and the cyclic ester in a weight ratio of from 100:10 to 100:34.

6. The antistatic molded article according to claim 1, wherein said molded article is prepared by copolymerizing the cyclic amide and a mixture of the cyclic ester and a linear ester selected from the group consisting of polyesterpolyol, polyesteretherpolyol, and polycarbonatepolyol in a weight ratio of the cyclic amide to the mixture of from 100:2 to 100:50.

7. The antistatic molded article according to claim 6, wherein said molded article is prepared by copolymerizing the cyclic amide the mixture in a weight ratio of the cyclic amide to the mixture of from 100:2 to 100: less than 5, wherein an electrically conductive material is further provided.

8. The antistatic molded article according to claim 6, wherein said molded article is prepared by copolymerizing the cyclic amide the mixture, in a weight ratio of the cyclic amide to the mixture of from 100:5 to 100:45.

9. The antistatic molded article according to any one of claims 1–8, having a tensile strength, measured according to ASTM D-638, of at least 40 MPa.

10. The antistatic molded article according to claim 8, wherein the linear ester in said mixture is polycaprolactonediol.

11. The antistatic molded article according to claim 1, wherein the cyclic ester is ε-caprolactone.

12. The antistatic molded article comprising a polyesteramide resin according to claim 1, wherein the cyclic amide is ε-caprolactam.

13. A polyesteramide resin prepared by reacting
100 parts by weight of (a) a cyclic amide,
5 to 50 parts by weight of a mixture ($b_1$) a cyclic ester and at least 5 parts by weight of a linear ester ($b_2$) selected from the group consisting of polyesterpolyol, polyesteretherpolyol and polycarbonatepolyol and
(c) a chemical compound having a molecular weight of 200 or smaller and having at least 2 hydroxyl groups, wherein said resin has a number average molecular weight, reduced from polystyrene, of from 4,000 to 100,000.

14. The polyesteramide resin according to claim 13, wherein said polyesteramide resin has a surface resistivity of from $10^6$ to $10^9 \Omega$.

15. The polyesteramide resin according to claim 13, wherein said polyesteramide resin has a volume resistivity of from $10^4$ to $10^7 \Omega.m$.

16. The polyesteramide resin according to claim 13, wherein the chemical compound (c) is used in such an amount that the molar ratio of the hydroxyl groups, defined by the following equation, is in the range of from 0.1 to 1.0, wherein the molar ratio of the hydroxyl groups=molar amount of the hydroxyl group of the chemical compound (c)/molar amount of the hydroxyl group of the linear ester ($b_2$).

17. The polyesteramide resin according to claim 16 wherein the molar ratio of the hydroxyl groups is in the range of from 0.2 to 0.5.

18. The polyesteramide resin according to claim 13, wherein the chemical compound (c) has at least 3 hydroxyl groups.

19. The polyesteramide resin according to claim 18, wherein the chemical compound (c) is trimethylolethane, trimethylolpropane or a mixture of trimethylolethane and trimethylolpropane.

20. The polyesteramide resin according claim 13, wherein the cyclic amide (a) is ε-caprolactam.

21. The polyesteramide resin according to claim 13, wherein the cyclic ester ($b_1$) is ε-caprolactone.

22. The polyesteramide resin according to claim 13, wherein the linear ester ($b_2$) is polycaprolactonediol.

23. An antistatic molded article comprising a polyesteramide resin according to claim 13.

24. The antistatic molded article according to claim 1, wherein said molded article is prepared by a monomer casting method.

25. A method for preparing an antistatic polyesteramide resin by ring-opening copolymerizing (a) a cyclic amide and ($b_1$) a cyclic ester in a weight ratio of from 100:3 to 100:44.

26. The method according to claim 25, wherein the cyclic amide (a) and the cyclic ester ($b_1$) are ring-opening copolymerized in a weight ratio of from 100:10 to 100:34.

27. A method for preparing an antistatic polyesteramide resin by copolymerizing (a) a cyclic amide and a mixture of ($b_1$) a cyclic ester and a linear ester ($b_2$) selected from the group consisting of polyester polyol, polyesteretherpolyol, and polycarbonatepolyol, in a weight ratio of from 100:2 to 100:50.

28. The method according to claim 27, wherein the cyclic amide (a) and the mixture of the linear ester ($b_2$) and the cyclic ester ($b_1$) are copolymerized in a weight ratio of from 100:5 to 100:45.

29. The method according to claim 27, wherein the linear ester ($b_2$) is polycaprolactonediol.

30. The method according to claim 25, wherein the cyclic ester ($b_1$) is ε-caprolactone.

31. The method according to claim 25, wherein the cyclic amide (a) is ε-caprolactam.

32. A method for preparing a polyesteramide resin by reacting 100 parts by weight of (a) a cyclic amide, 5 to 50 parts by weight of a mixture of ($b_1$) a cyclic ester and at least 5 parts by weight of ($b_2$) at least one linear ester selected from the group consisting of polyesterpolyol, polyesteretherpolyol, and polycarbonatepolyol, and a chemical compound (c) having a molecular weight of 200 or smaller and having at least 2 hydroxyl groups.

33. The method according to claim 32, wherein the chemical compound (c) is reacted in such an amount that the molar ratio of the hydroxyl groups, defined by the following equation, is in the range of from 0.1 to 1.0, wherein the molar ratio of the hydroxyl groups=molar amount of the hydroxyl group of the chemical compound (c)/molar amount of the hydroxyl group of the linear ester ($b_2$).

34. The method according to claim 33, wherein the molar ratio of the hydroxyl groups is in the range of from 0.2 to 0.5.

35. The method according to claim 32, wherein the chemical compound (c) has at least 3 hydroxyl groups.

36. The method according to claim 35, wherein the chemical compound (c) is trimethylolethane, trimethylolpropane of a mixture of trimethylolethane and trimethylolpropane.

37. The method according to claim 32, wherein the linear ester ($b_2$) is polycaprolactonediol.

38. The method according to claim 32, wherein the cyclic ester ($b_1$) is ε-caprolactone.

39. The method according to claim 32, wherein the cyclic amide (a) is ε-caprolactam.

40. The method according to claim 25, wherein a monomer casting method is used for copolymerizing the cyclic amide (a) and the cyclic ester ($b_1$).

41. The method according to claim 32, wherein a monomer casting method is used for reacting the cyclic amide (a), the mixture of the cyclic ester ($b_1$) and the linear ester ($b_2$), and the chemical compound (c).

42. A method for making a polyesteramide resin antistatic, wherein the polyesteramide resin is prepared by ring-opening copolymerizing (a) a cyclic amide and ($b_1$) a cyclic ester, wherein the weight ratio of the cyclic amide (a) to the cyclic ester ($b_1$) is set in a range of from 100:3 to 100:44.

43. The method according to claim 42, wherein the weight ratio of the cyclic amide (a) to the cyclic ester ($b_1$) is set in a range of from 100:10 to 100:34.

44. A method for making a polyesteramide resin antistatic, wherein the polyesteramide resin is prepared by copolymerizing (a) a cyclic amide and a mixture of ($b_1$) a cyclic ester and ($b_2$) a linear ester selected from the group consisting of polyesterpolyol, polyesteretherpolyol, and polycarbonatepolyol, wherein the weight ratio of the cyclic amide (a) to the mixture of the cyclic ester ($b_1$) and the linear ester ($b_2$) is set in a range of from 100:2 to 100:50.

45. The method according to claim 44, wherein the weight ratio of the cyclic amide (a) to the mixture of the cyclic ester ($b_1$) and the linear ester ($b_2$) is set in a range of from 100:5 to 100:45.

46. A method for making a polyesteramide resin antistatic, wherein the polyesteramide resin is prepared by copolymerizing (a) a cyclic amide and a mixture of ($b_1$) a cyclic ester and ($b_2$) at least one linear ester selected from the group consisting of polyesterpolyol, polyesteretherpolyol or polycarbonatepolyol, wherein the weight ratio of the mixture of the linear ester ($b_2$) and the cyclic ester ($b_1$) is set in the range of from 100:5 to 100:50, wherein the weight ratio of the linear ester ($b_2$) to the cyclic amide (a) is at least 5:100, and a chemical compound (c) having a molecular weight of 200 or smaller and having at least 2 hydroxyl groups.

47. The method according to claim 46, wherein the chemical compound (c) is added in such an amount that the molar ratio of the hydroxyl groups, defined by the following equation, is in the range of from 0.1 to 1.0, wherein the molar ratio of the hydroxyl groups=molar amount of the hydroxyl group of the chemical compound (c)/molar amount of the hydroxyl group of the linear ester ($b_2$).

48. The method according to claim 47, wherein the molar ratio of the hydroxyl groups is in the range of from 0.2 to 0.5.

49. The method according to claim 46, wherein the chemical compound (c) has at least 3 hydroxyl groups.

50. The method according to claim 49, wherein the chemical compound (c) is trimethylolethane, trimethylolpropane or a mixture of trimethylolethane and trimethylolpropane.

51. The method according to claim 44, wherein the linear ester ($b_2$) is polycaprolactonediol.

52. The method according to claim 42, wherein the cyclic ester ($b_1$) is ε-caprolactone.

53. The method according to claim 42, wherein the cyclic amide (a) is ε-caprolactam.

54. The method according to claim 42, wherein the polyesteramide resin is prepared by a monomer casting method.

* * * * *